(12) United States Patent
Zhang et al.

(10) Patent No.: US 12,615,535 B2
(45) Date of Patent: Apr. 28, 2026

(54) INTER-OPERATOR, INTER-BASE STATION CROSS-LINK INTERFERENCE MITIGATION

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/311,194

(22) Filed: May 2, 2023

(65) Prior Publication Data

US 2023/0362703 A1      Nov. 9, 2023

Related U.S. Application Data

(60) Provisional application No. 63/364,414, filed on May 9, 2022.

(51) Int. Cl.
| | |
|---|---|
| *H04W 24/10* | (2009.01) |
| *H04B 17/336* | (2015.01) |
| *H04W 16/28* | (2009.01) |

(52) U.S. Cl.
CPC .......... *H04W 24/10* (2013.01); *H04B 17/336* (2015.01); *H04W 16/28* (2013.01)

(58) Field of Classification Search
CPC ..... H04W 24/10; H04W 16/28; H04W 24/02; H04B 17/336
See application file for complete search history.

(56) References Cited

U.S. PATENT DOCUMENTS

| | | | |
|---|---|---|---|
| 2021/0006997 A1* | 1/2021 | Jin ........................ | H04B 17/382 |
| 2021/0321281 A1* | 10/2021 | Wei ........................ | H04W 24/10 |
| 2022/0053514 A1* | 2/2022 | Barbu ................... | H04L 5/0091 |
| 2022/0190995 A1* | 6/2022 | Zhou .................... | H04B 7/0413 |
| 2022/0278788 A1* | 9/2022 | Pedersen .............. | H04L 5/0035 |
| 2023/0164824 A1* | 5/2023 | Kusashima ........... | H04L 1/0003 |
| | | | 370/281 |
| 2025/0167902 A1* | 5/2025 | Li ........................ | H04B 7/0695 |

* cited by examiner

*Primary Examiner* — Deepa Belur
(74) *Attorney, Agent, or Firm* — Procopio, Cory, Hargreaves & Savitch LLP

(57) ABSTRACT

A network node identifies cross-link interference to a first channel of a first network node associated with a first operator, the cross-link interference being caused by a second channel from a second network node that is associated with a second operator that is different than the first operator. The network node reports the cross-link interference to the first channel of the first network node with information to identify at least one of the second channel or the second network node.

31 Claims, 13 Drawing Sheets

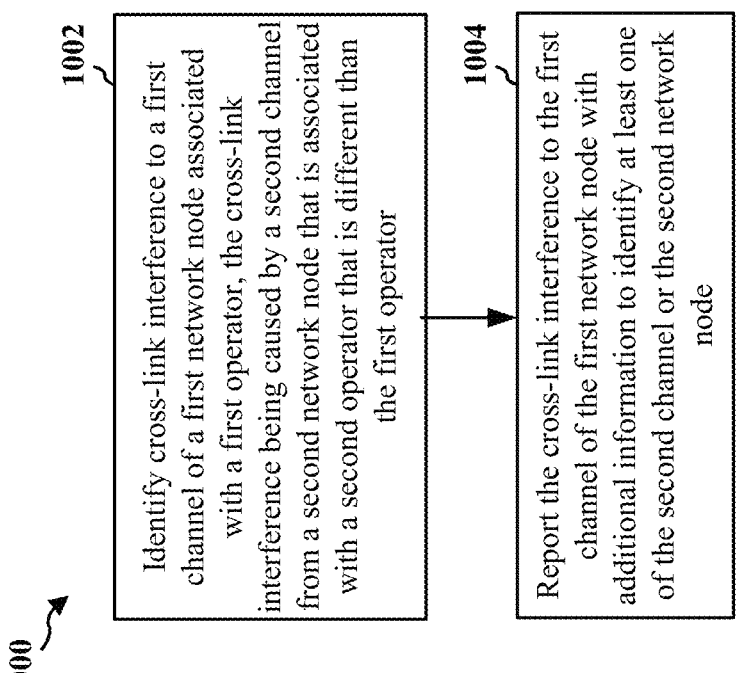

1000

1002

Identify cross-link interference to a first channel of a first network node associated with a first operator, the cross-link interference being caused by a second channel from a second network node that is associated with a second operator that is different than the first operator

1004

Report the cross-link interference to the first channel of the first network node with additional information to identify at least one of the second channel or the second network node

FIG. 10

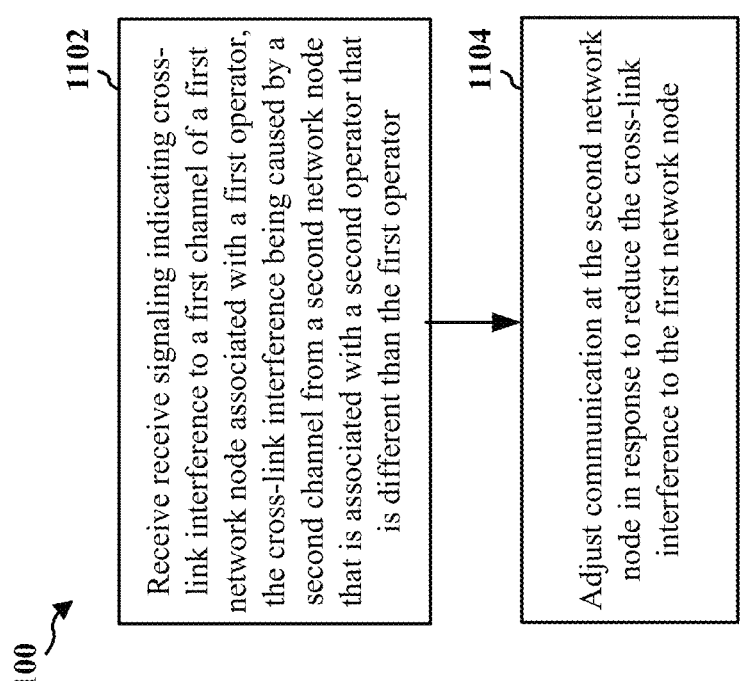

1100

1102

Receive receive signaling indicating cross-link interference to a first channel of a first network node associated with a first operator, the cross-link interference being caused by a second channel from a second network node that is associated with a second operator that is different than the first operator

1104

Adjust communication at the second network node in response to reduce the cross-link interference to the first network node

INTER-OPERATOR, INTER-BASE STATION CROSS-LINK INTERFERENCE MITIGATION

CROSS REFERENCE TO RELATED APPLICATION(S)

This application claims the benefit of and priority to U.S. Provisional Application Ser. No. 63/364,414 entitled "Inter-Operator, Inter-Base Station Cross-Link Interference Mitigation" and filed on May 9, 2022, which is expressly incorporated by reference herein in its entirety.

TECHNICAL FIELD

The present disclosure relates generally to communication systems, and more particularly, to wireless communication including inter-operator, inter-base station cross-link interference (CLI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus identifies cross-link interference to a first channel of a first network node associated with a first operator, the cross-link interference being caused by a second channel from a second network node that is associated with a second operator that is different than the first operator. The apparatus reports the cross-link interference to the first channel of the first network node with information to identify at least one of the second channel or the second network node.

In an aspect of the disclosure, a method, a computer-readable medium, and an apparatus are provided. The apparatus receives signaling indicating cross-link interference to a first channel of a first network node associated with a first operator, the cross-link interference being caused by a second channel from a second network node that is associated with a second operator that is different than the first operator. The apparatus adjusts communication at the second network node in response to reduce the cross-link interference to the first network node.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a flowchart of a method of wireless communication.

FIG. 11 is a flowchart of a method of wireless communication.

DETAILED DESCRIPTION

Figure 1:
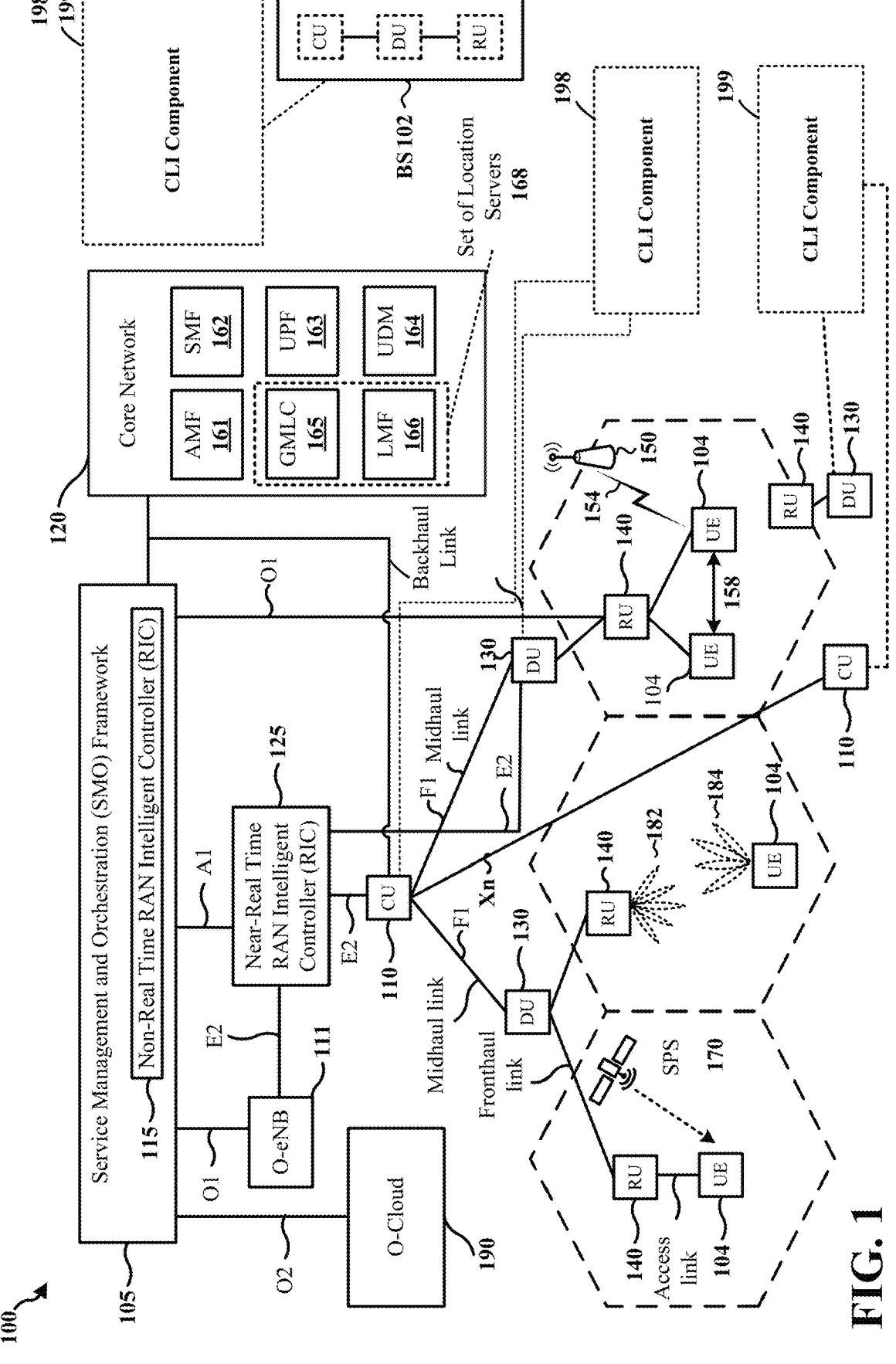
FIG. 1 is a diagram illustrating an example of a wireless communications system and an access network.

In some aspects, transmissions in a channel may cause interference to reception in the same channel. Network components of an operator may address the cross-link interference (CLI) within the channel. In some aspects, transmissions in one channel for a network node, such as a distributed unit (DU) of one operator may cause interference to reception of a different channel for a different network node, e.g., a different DU, of a different operator. Aspects presented herein provide for mitigation of such inter-operator, inter-base station CLI. As presented herein, a first CU from a first operator may report the inter-operator CLI to a second CU of a second operator along with information that enables the second CU to identify the channel, beam, base station, etc. that is causing the CLI. In some aspects, the first CU may provide one or more recommendations for addressing the CLI to the second CU. Full-duplex communication may help to reduce latency and improve spectrum efficiency, resource use, and coverage. The aspects presented herein provides for beam-based coordination between network nodes to mitigate inter-base station CLI while allowing for full-duplex communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs

140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-H Alliance) on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the DU 130, the CU 110, the base station 102 or one or more components of the base station 102 may include a CLI component 198 configured to identify cross-link interference to a first channel of a first network node associated with a first operator, the cross-link interference being caused by a second channel from a second network node that is associated with a second operator that is different than the first operator. The CLI component 198 may be further configured to report the cross-link interference to the first channel of the first network node with information to identify at least one of the second channel or the second network node.

In some aspects, the DU 130, the CU 110, a base station 102 or one or more components of a base station 102 may include a CLI component 199 configured to receive signaling indicating cross-link interference to a first channel of a first network node associated with a first operator, the cross-link interference being caused by a second channel from a second network node that is associated with a second operator that is different than the first operator. The CLI component 199 may be further configured to adjust communication at the second network node in response to reduce the cross-link interference to the first network node. Although the following description may be focused on 5G NR, the concepts described herein may be applicable to other similar areas, such as LTE, LTE-A, CDMA, GSM, and other wireless technologies.

Figures 2A, 2B, 2C, 2D:
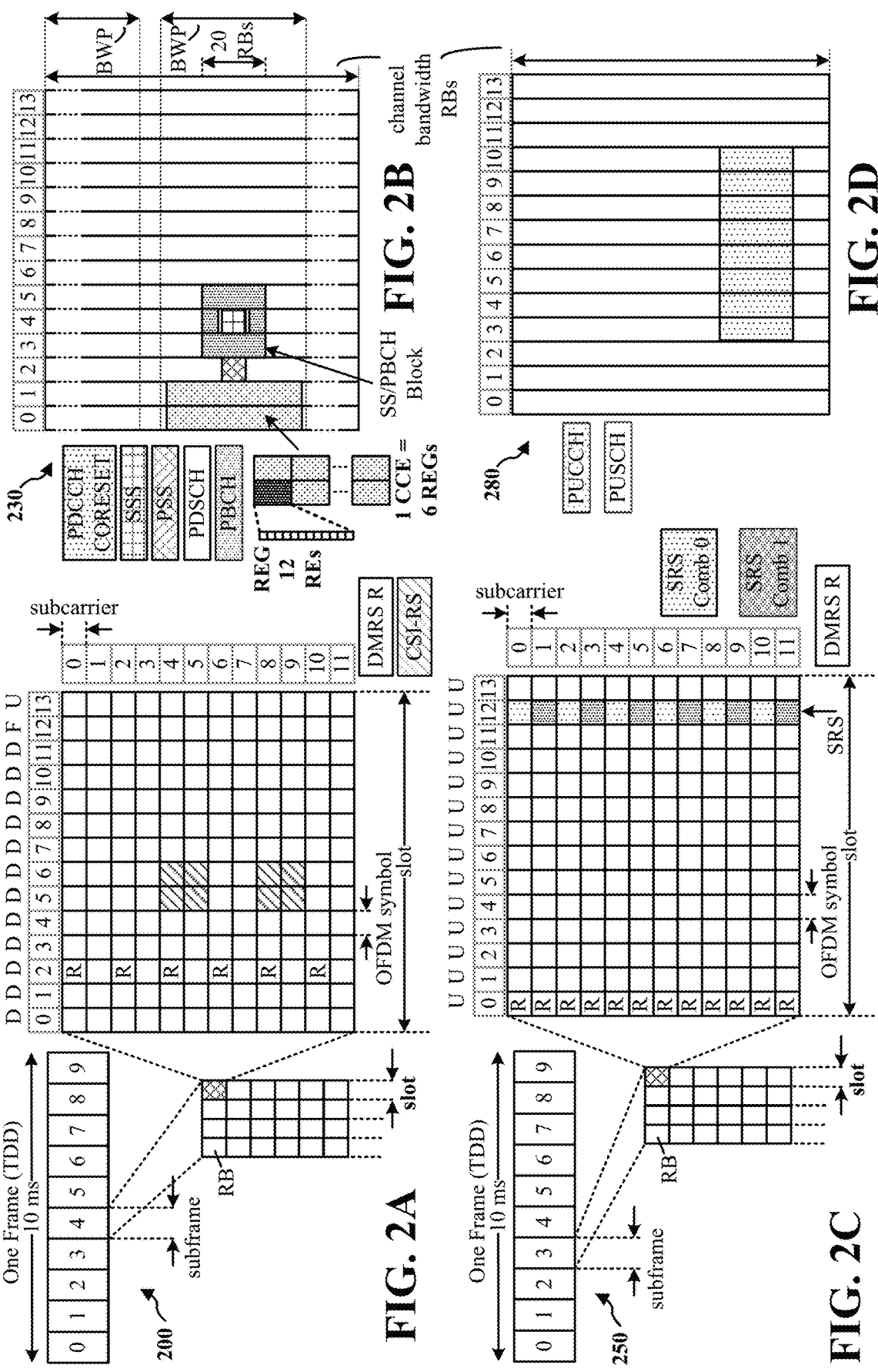
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15$[kHz] | Cyclic prefix |
| 0 | 15 | Normal |
| 1 | 30 | Normal |
| 2 | 60 | Normal, Extended |

TABLE 1-continued

| Numerology, SCS, and CP | | |
| --- | --- | --- |
| μ | SCS $\Delta f = 2^{\mu} \cdot 15$[kHz] | Cyclic prefix |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
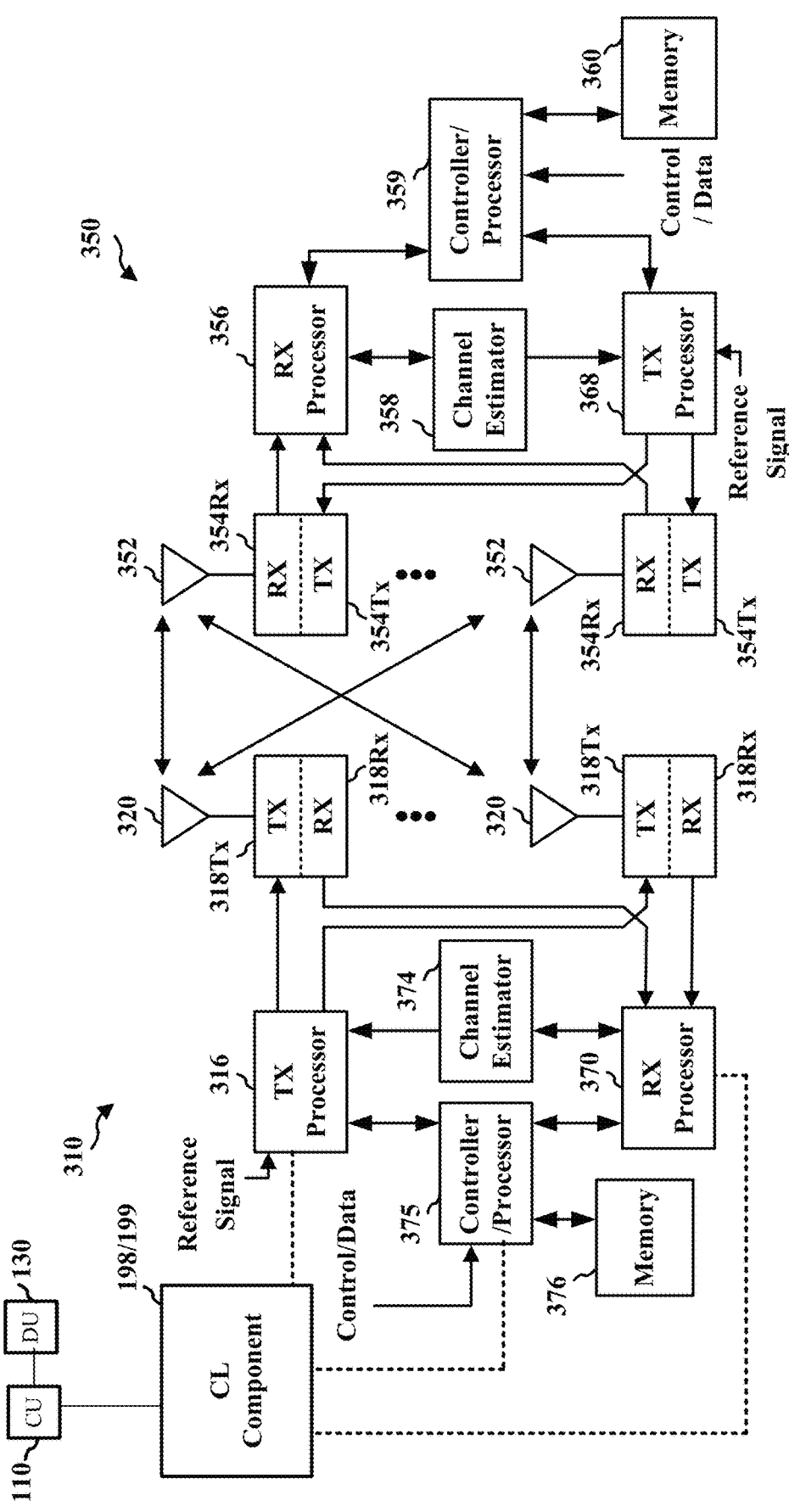
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 316, the RX processor 370, and the controller/processor 375 may be configured to perform aspects in connection with the CLI component 198 or 199 of FIG. 1.

Wireless communication systems may be configured to share available system resources and provide various telecommunication services (e.g., telephony, video, data, messaging, broadcasts, etc.) based on multiple-access technologies that support communication with multiple users.

Figure 4:
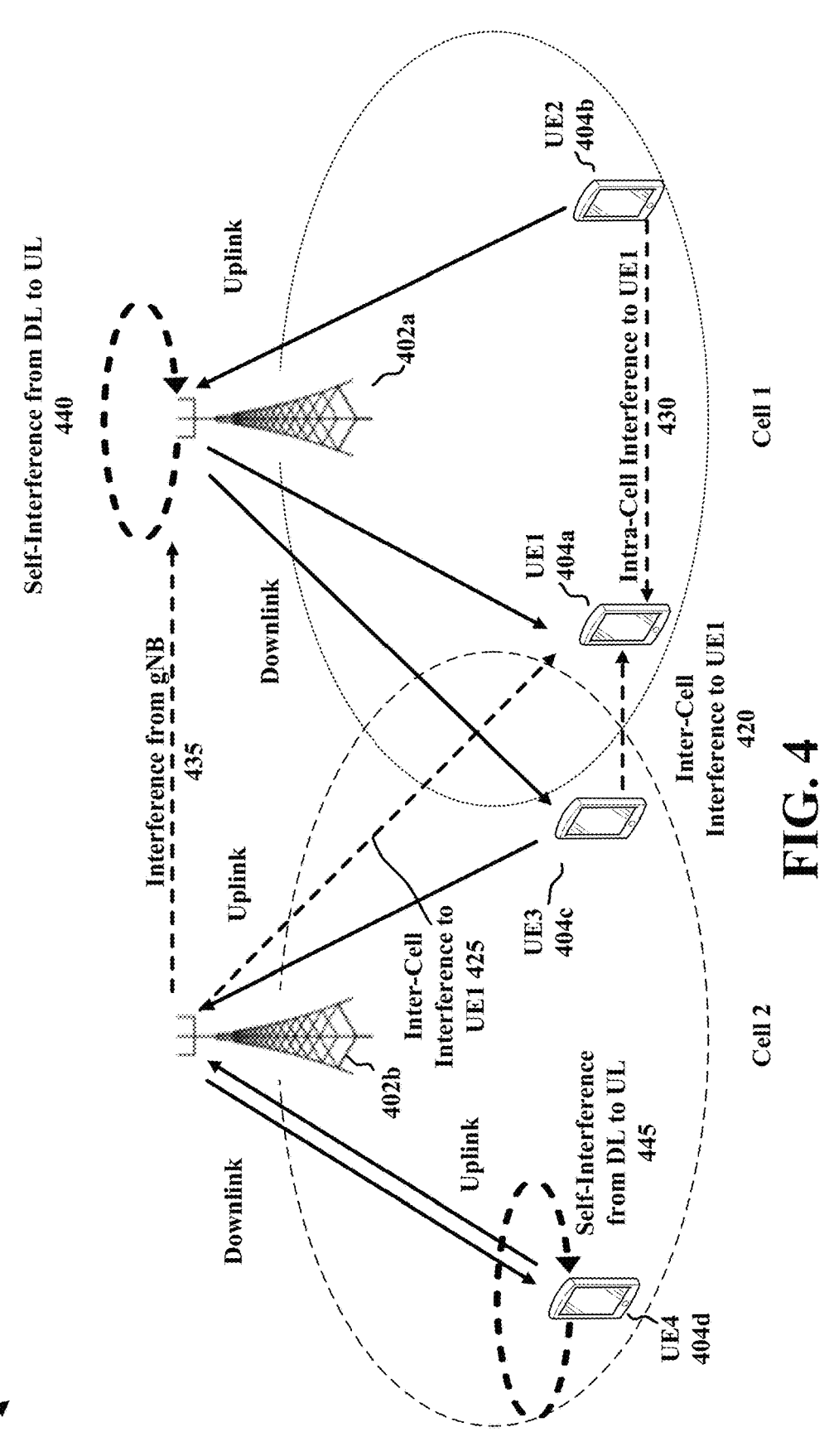
FIG. 4 illustrates various modes of duplexed communications, such as full-duplex communication and time-duplexed communication.

FIG. 4 illustrates a communication system diagram 400 showing various modes of duplexed communications, such as full-duplex communication and time-duplexed communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication in time. The full-duplex communication may reduce latency in communication by allowing transmission to occur while reception is being performed (e.g., overlapping in time) or allowing reception while transmission is being performed, e.g., such as enabling the reception of downlink signals in uplink slots. By providing more transmission opportunities, communication can be sent more quickly with less latency. In some aspects, full-duplex communication may improve spectrum efficiency, e.g., per cell or per UE. Full-duplex communication may enable more efficient resource utilization and may allow for coverage improvements. Due to the simultaneous Tx/Rx nature of full-duplex communication (e.g., overlapping in time), a UE or a base station may experience self-interference caused by signal leakage from its local transmitter to its local receiver, e.g., in which a signal transmitted by the UE or base station is received as interference to its reception of another signal. In addition, the UE or base station may also experience interference from other devices, such as transmissions from a second UE or a second base station. Such interference (e.g., self-interference or interference caused by other devices) may impact the quality of the communication, or even lead to a loss of information. Time-duplexed communication supports transmission and reception of information over a same frequency band in a manner that does not overlap in time. Due to transmission delay, a UE or base station may experience interference from other devices caused by time delays associated with transmissions received from the other devices.

Figure 5A:
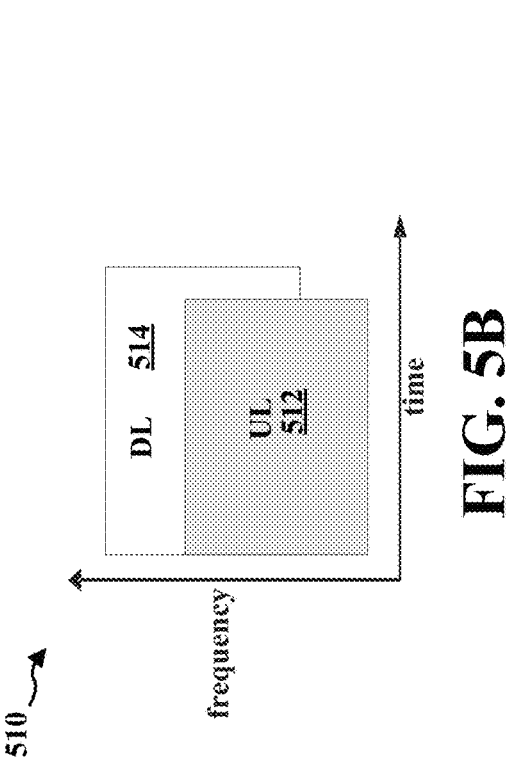
FIG. 5A is a diagram illustrating a first example of a resource allocation for (fully-overlapping) in-band full-duplex (IBFD) communication.

FIG. 5A is a diagram 500 illustrating a first example of a resource allocation for (fully-overlapping) in-band full-duplex (IBFD) communication. The resource allocation for IBFD communication may include a first set of UL resources 502 and a second set of DL resources 504. As shown in the first diagram 500, a time and a frequency allocation of a set of UL resources 502 may fully overlap with a time and a frequency allocation of DL resources 504.

Figure 5B:
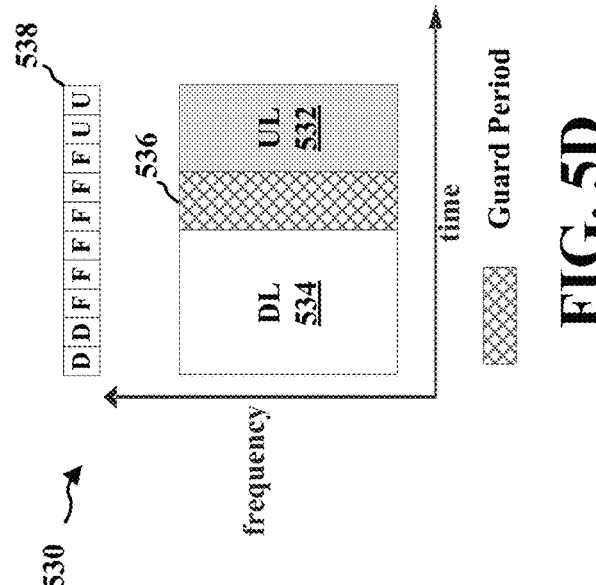
FIG. 5B is a second diagram illustrating a second example of a resource allocation for (partially-overlapping) in-band full-duplex communication.

FIG. 5B is a second diagram 510 illustrating a second example of a resource allocation for (partially-overlapping) in-band full-duplex communication. The resource allocation for IBFD communication may include a first set of UL resources 512 and a second set of DL resources 514. In the second diagram 510, a time and a frequency allocation of the UL resources 512 may partially overlap with a time and a frequency of allocation of the DL resources 514.

In some aspects, a base station may be in full-duplex communication with a first UE and a second UE based on the resource allocation illustrated in diagrams 500 and 510. For example, referring to FIG. 4, a first base station 402a is in full-duplex communication with a first UE 404a and a second UE 404b. The first base station 402a may be a full-duplex base station, whereas the first UE 404a and the second UE 404b may be configured as either a half-duplex UE or a full-duplex UE. The second UE 404b may transmit a first uplink signal to the first base station 402a as well as to other base stations, such as a third base station (not shown) in proximity to the second UE 404b. The first base station 402a transmits a downlink signal to the first UE 404a concurrently with receiving the uplink signal from the second UE 404b. In some aspects, the base station 402a may receive uplink communication with a first antenna panel and may transmit downlink communication with a second antenna panel. Similarly, a UE such as the UE 404d may transmit from one antenna panel and receive from another antenna panel in a full-duplex mode. In some aspects, a full-duplex capability may be based on beam separation characteristics between a first for transmission and a beam for reception. The beam separation characteristic maybe based on a measurement of self-interference, a measurement of a clutter echo, etc. The base station 402a may experience self-interference 440 from the receiving antenna that is receiving the uplink signal from UE 404*b* receiving some of the downlink signal being transmitted to the UE 404*a*. The base station 402*a* may experience additional interference 435 due to signals from the second base station 402*b*. Interference may also occur at the first UE 404*a* based on signals from third UE 404*c*, the second base station 402*b*, as well as from uplink signals from the second UE 404*b*, e.g., inter-cell interference 420, inter-cell interference 425 and intra-cell interference 430, respectively.

Figure 5C:
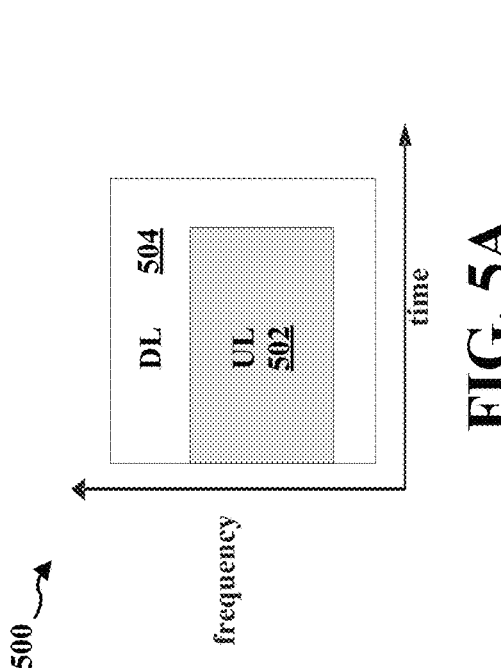
FIG. 5C is a third diagram illustrating a third example of a resource allocation for sub-band full-duplex (SBFD) communication.

FIG. 5C is a third diagram 520 illustrating a third example of a resource allocation for sub-band full-duplex (SBFD) communication. The resource allocation for SBFD communication may include a first set of UL resources 522 in a first sub-band, a second set of DL resources 524 (e.g., including sub-band DL resource 524*a*, sub-band DL resource 524*b*, sub-band DL resource 524*c*, and sub-band DL resource 524*d*), and a third set of guard band resources 526. As shown in FIG. 5C, the UL resources 522 are separated from the DL resources in the set of DL resources 524 by guard band resources 526. The guard band may be frequency resources, or a gap in frequency resources, provided between the UL resources 522 and the DL resources in the set of DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter, may extend outside the UL resources, the guard band may reduce interference experienced by the UE. Sub-band FDD may also be referred to as "flexible duplex".

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full-duplex resources) or may occur in adjacent or slightly separated frequency resources, such as shown in FIG. 5C (e.g., sub-band full-duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols.

The set of DL resources 524 may be used for communication between the first base station 402*a* and the second UE 404*b* while the first set of UL resources 522 may be used for communication between one of the first base station 402*a* and the second UE 404*b* or the second base station 402*b* and the third UE 404*c*. For example, the set of time resources including the first set of UL resources 522 and the second set of DL resources 524 may be in a flexible slot that the first base station 402*a* configures the slot for a DL transmission via the sub-band DL resources 524*a*-524*b* while the second base station 402*b* configures the slot for an UL transmission via the first set of UL resources 522 (e.g., a disjoint sub-band from the sub-bands used for the DL transmissions associated with the first base station).

In some aspects, a base station may be in full-duplex communication with a first UE and a second UE based on the resource allocation illustrated in diagrams 500 and 510. For example, referring to FIG. 4, a first base station 402*a* is in full-duplex communication with a first UE 404*a* and a second UE 404*b*. In some aspects, a third UE 404*c* may be a full-duplex UE in communication with a first base station

402*a* and a second base station 402*b* or the fourth UE 404*d* may be in full-duplex communication with a second base station 402*b*.

The first base station 402*a* and the second base station 402*b* may serve as multiple transmission and reception points (multi-TRPs) for UL and DL communication with the UEs 404*a*-404*d*. The fourth UE 404*d* may concurrently transmit an uplink signal to the second base station 402*b* while receiving a downlink signal from the second base station 402*b*. The fourth UE 404*d* may experience self-interference 445, the first UE 404*a* may experience inter-cell interference 425, or the first UE 404*a* may experience intra-cell interference 430, as a result of the first signal and the second signal being communicated simultaneously, e.g., the uplink signal may leak to, e.g., be received by, the UE's receiver. The fourth UE 404*d* may experience additional interference from the third UE 404*c*.

Figure 5D:
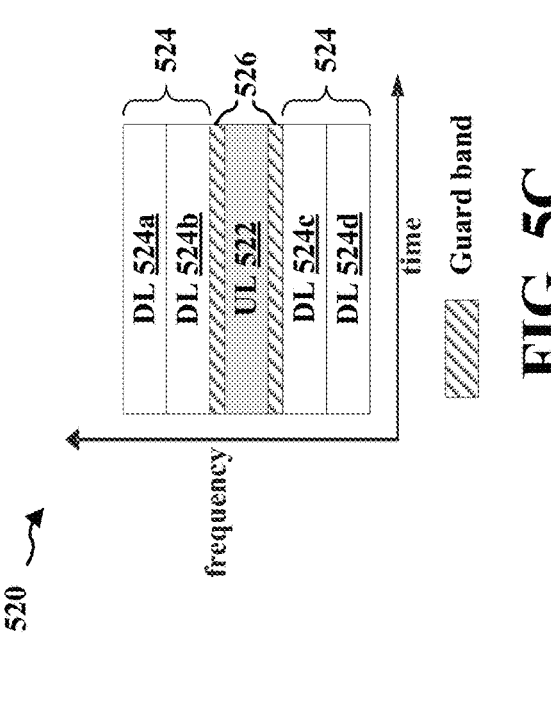
FIG. 5D is a fourth diagram illustrating a fourth example of a resource allocation for flexible, or dynamic, time division duplexed (TDD) communication.

FIG. 5D is a fourth diagram 530 illustrating a fourth example of a resource allocation for flexible, or dynamic, time division duplexed (TDD) communication. For example, a set of slot designations 538 may indicate that a first set of slots may be downlink ("D") slots, a second set of slots may be flexible ("F") slots that may be configured as either DL or UL slots, and a third set of uplink ("U") slots. Based on the slot designations 538, one of the first base station 402*a* or the second base station 402*b* may configure slots for communication as illustrated in the fourth diagram 530 to include a first set of DL resources 534 a second set of UL resources 532 and a third guard band 536 that may be configured to provide separation between a DL data transmission via the first set of DL resources 534 and a UL data transmission via the second set of UL resources 532. As shown in FIG. 5D, the UL resources 532 are separated from the DL resources 534 by a guard band 536. The guard band may be time resources, or a gap in time resources, provided between the UL resources 532 and the DL resources 534. Separating the UL time resources and the DL time resources with a guard band may help to reduce self-interference. UL resources and a DL resources that are immediately adjacent to each other correspond to a guard band width of 0. As an output signal, e.g., from a UE transmitter, may extend outside the UL resources, the guard band may reduce interference experienced by the UE. Sub-band TDD may also be referred to as "flexible duplex".

As described above, a slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full-duplex resources) or may occur in adjacent or slightly separated frequency resources, such as shown in FIG. 5C (e.g., sub-band full-duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols.

In some aspects, interference may be experienced between base stations of different operators. As an example, interference between base stations of a same operator may include interference to a same channel (e.g., carrier), which may be referred to as co-channel interference, whereas, base stations of different operators may include interference between different channels, which may be referred to as adjacent channel interference. Different wireless operators use different channels, and the adjacent channel interference may refer to inter-operator, inter-base station interference. In an NR wireless communication setting, such inter-base station interference may be referred to as inter-gNB interference. Such inter-operator, inter-base station interference may be based on dynamic TDD communication, e.g., as described in connection with FIG. 5D, and in which uplink communication for one base station overlaps in time with downlink communication for another base station. In some aspects, the inter-operator, inter-base station interference may include sub-band full-duplex communication, e.g., as shown at 550 and/or fully overlapping full-duplex communication, e.g., as shown at 655. Aspects presented herein provide solutions for base stations that are for different operators, and provides additional inter-operator, inter-base station signaling that enables inter-base station CLI handling for base stations of different operators.

Figure 6:
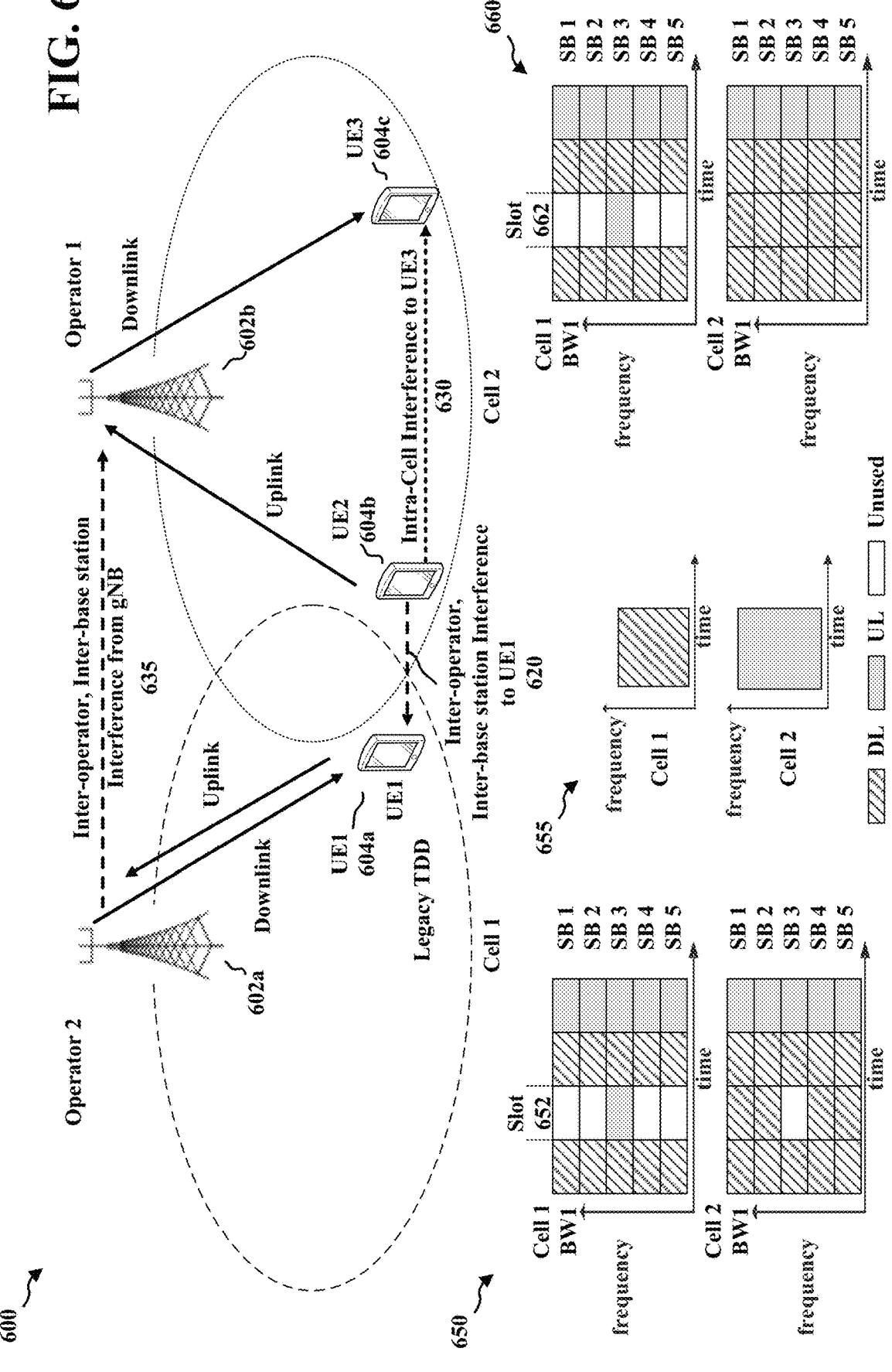
FIG. 6 includes a diagram illustrating various modes of duplexed communications, such as full-duplex communication and time-duplexed communication, between a first base station and a first UE and/or a second base station and one or more of a second UE and/or a third UE.

FIG. 6 includes a diagram 600 illustrating various modes of duplexed communications, such as full-duplex communication and time-duplexed communication, between a first base station 602a of a first operator and a first UE 604a and/or a second base station 602b of a second operator and one or more of a second UE 604b and/or a third UE 604c.

For example, diagrams 650 and 660 illustrate a set of frequency and time resources used by the first base station 602a in a first cell (e.g., cell 1) for the first operator and a second base station 602b in a second cell (e.g., cell 2) of a second operator for TDD communication in a set of slots including a flexible (F or D+U) slot 652 or 662. Diagram 650 illustrates that, during the slot 652, a first base station 602a may use a third sub-band (SB 3) for an UL transmission while a second base station 602b may use a set of complementary (non-overlapping) sub-bands (SB1, SB2, SB4, and SB5) for DL transmission(s).

In some aspects, the first base station 602a and the second base station 602b may coordinate the use of complementary sub-bands, while in some aspects, the sub-bands may be autonomously selected and each of a set of data for the UL transmission and a set of data for the DL transmission may occupy less than all the available sub-bands. Diagram 660 illustrates that, during the slot 662, a first base station 602a of the first operator may use a third sub-band (SB 3) for an UL transmission while a second base station 602b of a second operator may use the full bandwidth (e.g., including SB3) for DL transmission(s). The slots 652 and 662 may be configured as a UL slot and the third sub-band may be selected for the UL transmission by the first base station 602a independently of a configuration of the slots 652 and 662 as a DL slot for the DL transmission at the second base station 602b. The overlapping or adjacent frequency allocation for UL and DL transmissions may lead to inter-operator, inter-base station interference 620, interference between the base stations 635. In some aspects, the transmissions may also lead to intra-cell interference 630 as described in relation to FIGS. 4 and 5A-5D. In some aspects, an UL transmission from the UE2 604b may cause interference to downlink reception at the UE1 604a, in other aspects, the interference may be caused to reception of uplink communication. As an example, the uplink transmission from the UE2 604b may cause interference to reception at the base station 602a of the uplink transmission from the UE 604a.

Figures 7A, 7B:
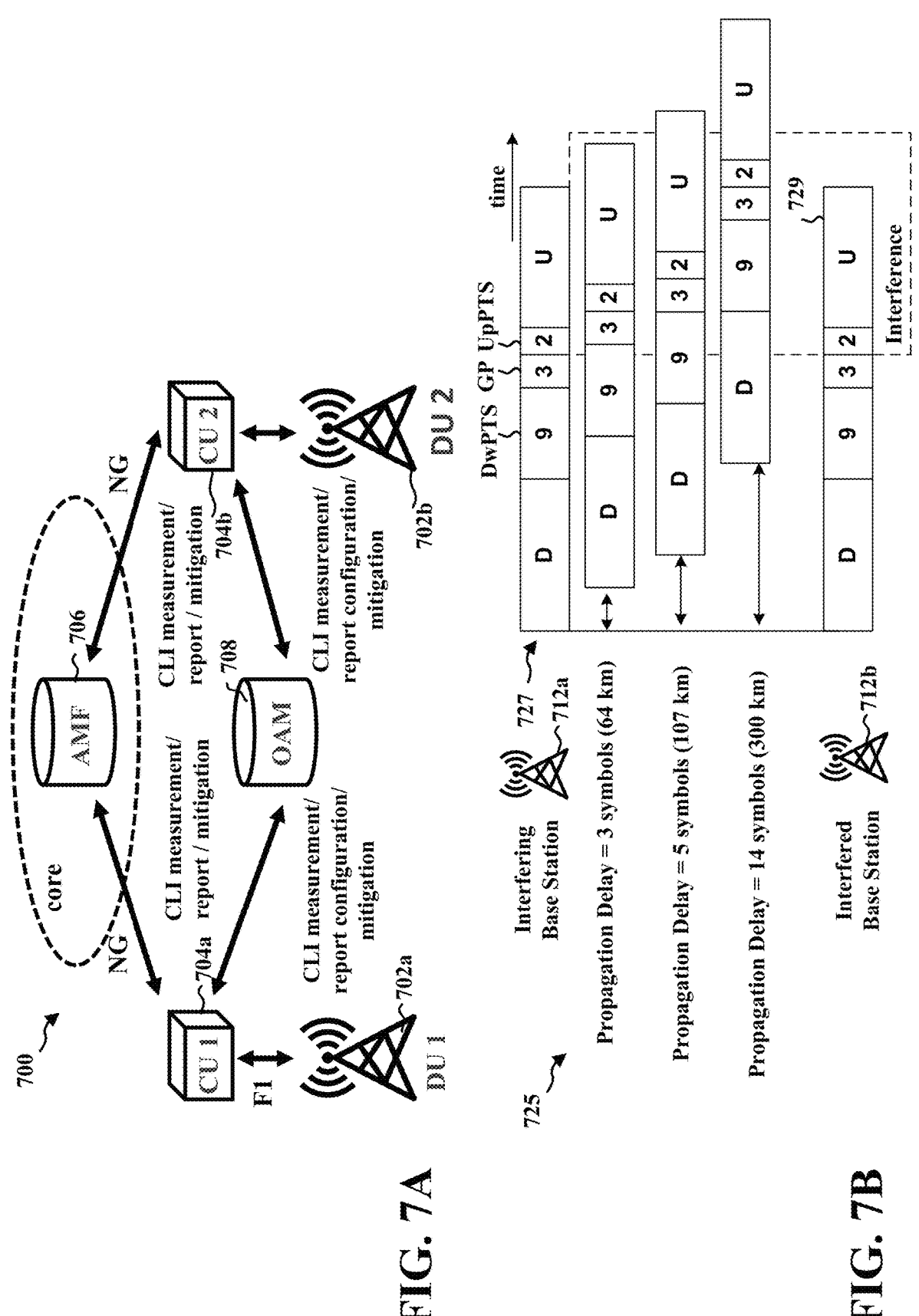
FIG. 7A illustrates an example of CLI mitigation between two base stations of a same operator.
FIG. 7B illustrates a time diagram showing aspects of potential interference due to propagation delay.

FIG. 7A illustrates an example wireless communication system 700 for different base stations of a single operator. For example, inter-base station (which may be referred to as inter-gNB for an NR wireless communication system) messaging may be exchanged in connection with remote interference management (RIM) measurement, reporting, and mitigation. In an Operations, Administration and Maintenance (OAM) managed mode, a first base station (e.g., DU 1 702a) may measure CLI based on transmissions for a second base station (e.g., DU 2 702b) of the operator, and may provide a CLI measurement report to the OAM 708, e.g., via CU 704a. The CLI measurement, report configuration, and mitigation of the CLI may be communicated between the base stations, CUs, and OAM. The CLI measurement and report may be layer 3 (L3) based measurements and L3 based reporting. The CLI report and/or communication about CLI mitigation may include a detected or disappeared RIM RS ID. The CLI report and/or communication about CLI mitigation may indicate that the mitigation is sufficient or may indicate that the mitigation is not sufficient to address the experienced CLI. As an example, for RS ID1, RS ID2, RS ID3, and RS ID4, the report may indicate RS ID1—yes, RS ID2—yes, RS ID3—no, RS ID4—no, which may indicate that mitigation is needed for communication associated with RS ID1 and RS ID2, but not for RS ID3 or RS ID4.

For a backhaul coordination mode, the first base station (e.g., DU 1 702a) may measure CLI based on transmissions for a second base station (e.g., DU 2 702b) of the operator, and may provide a CLI measurement report to the AMF 706, e.g., via CU 704a. For example, the CLI report and/or mitigation communication may be communicated from DU 1 702a to the CU 704a to the AMF 706 to the CU 704b and then to the DU 2 702b. The CLI measurement configuration may be configured by the OAM 708. For an over-the air (OTA) coordination mode, e.g., between base stations, the CLI measurement configuration for each base station 702a and 702b may be configured by the OAM 708.

FIG. 7B illustrates an example time diagram 725 that shows interference from an interfering base station 712a that causes interference to an interfered base station 712b based on a propagation delay between the two base station. FIG. 7B illustrates that at increased distances, the propagation delay increases. FIG. 7B illustrates resources for downlink transmission, a downlink pilot time slot (DwPTS), a guard period (GP) between the downlink and uplink communication, and an Uplink Pilot Time Slot (UpPTS), and resources for uplink reception for the interfering base station 712a. Due to a propagation delay, the guard period may not be sufficient to avoid an overlap between the downlink transmission of the interfering base station and the interfered base station, and the uplink reception at 729 may overlap in time with the downlink transmission and/or the DwPTS of the interfering base station, e.g., as shown at 727. In some aspects, atmospheric ducting may lead to interference from a distance base station.

Figures 8A, 8B:
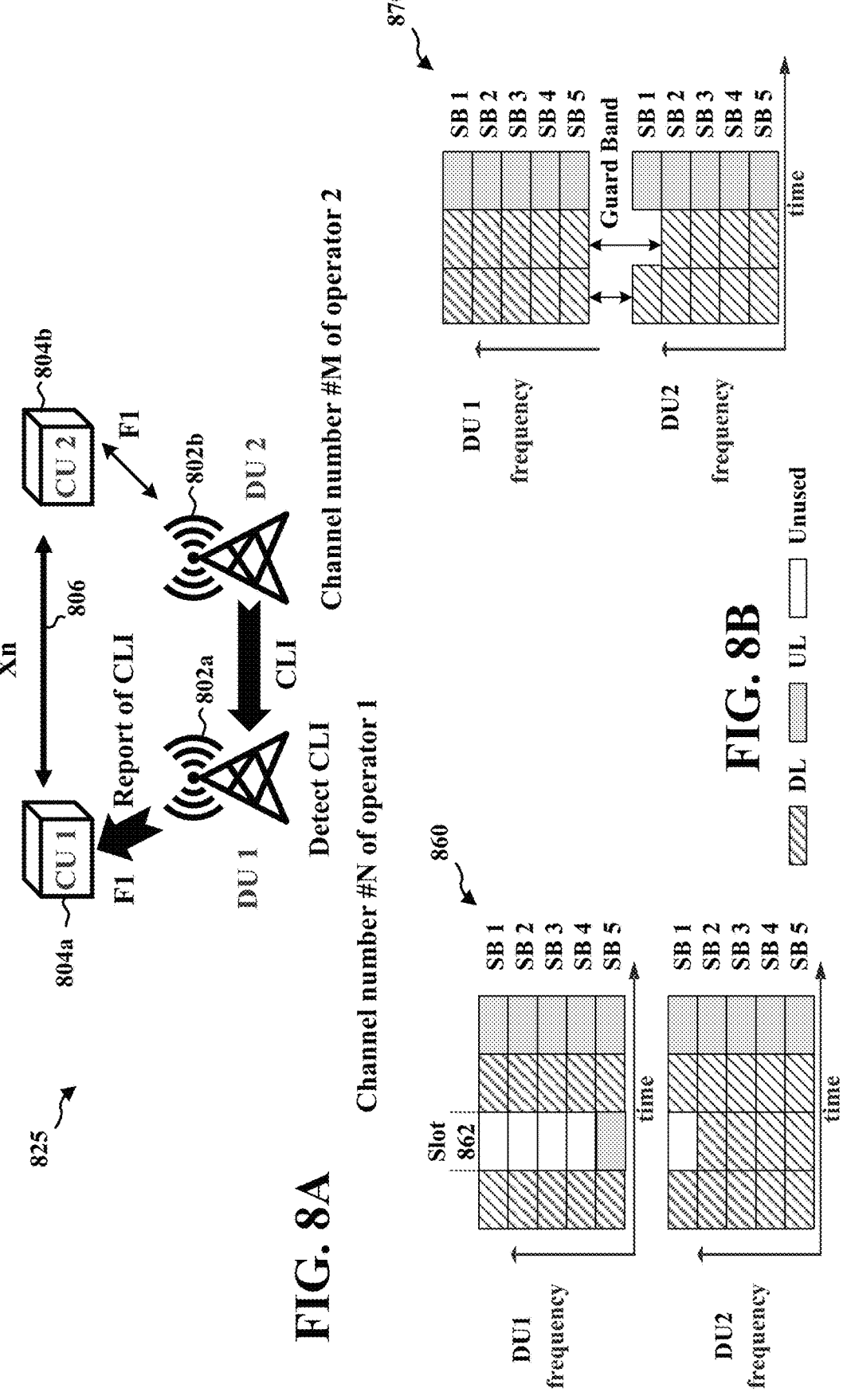
FIG. 8A illustrates an example of CLI reporting and mitigation between base stations of different operators.
FIG. 8B illustrates examples aspects of CLI mitigation.

If an interfered base station operating on channel number #N of a first operator (e.g., operator 1) detects interference (which may be referred to as blocking or jamming) at an adjacent channel (e.g. channel number #M) of another operator, the interfered base station (e.g., which may correspond to a gNB, a DU, etc.) may report the detection to its CU. FIG. 8A illustrates an example 825 in which DU1 802a detects interference on channel #N due to communication on channel #M for the DU2 702b of a different operator. The DU1 702a transmits a report of the CLI to the CU1 804a, e.g., in F1 signaling. The report can include the detected absolute radio-frequency channel number (ARFCN) for CU1 704a to identify which operator this adjacent channel number belongs to. The CU 1 may identify the corresponding operator (which may be referred to as a jamming operator), and provides inter-operator coordination signaling for inter-operator inter-gNB CLI mitigation. For example, the CU1 804*a* may signal to the CU2 804*b* about the CLI to DU1 802*a*, e.g., over Xn signaling 806.

The inter-operator signaling from the CU1 804*a* to the CU2 804*b* may include an inter-base station (which may be referred to as an inter-gNB in an NR communication system) blocking indication from an adjacent jamming channel of another operator. The indication may indicate the existence of interference to an adjacent channel of a different operator (e.g., operator 1 being interfered by communication for operator 2).

The inter-operator signaling from the CU1 804*a* to the CU2 804*b* may include a measured inter-base station CLI metric. As non-limiting examples, the CLI metrics may include a measurement of a received signal strength indicator (RSSI) at the DU1 702*a* based on the signal from the DU2 802*b*. The inter-operator signaling from the CU1 804*a* to the CU2 804*b* may include the channel/band identifier (e.g., ARFNC) for the CU2 804*b* to identify which ARFNC jammed the victim gNB of another operator. The inter-operator signaling from the CU1 804*a* to the CU2 804*b* may include location information or an ID for the interfering base station (e.g., DU2 702*b*) to further identify which base station/DU use the interfering channel of operator 2 caused interference to the DU1 702*a*. The inter-operator signaling from the CU1 804*a* to the CU2 804*b* may include beam direction information to enable the CU2 to identify a particular direction of communication from the DU2 702*b* that is causing the interference to the DU1 702*a*. As an example, the beam direction information may include a reception beam of DU1 702*a* on which the interference from the DU2 702*b* is measured. In some aspects, the beam direction information may include a transmission beam of the DU2 702*b*. The beam/direction information may enable the CU2 804*b* and/or the DU2 702*b* to take a mitigation action for a particular direction and to continue its communication without mitigation in other directions.

The inter-operator signaling from the CU1 804*a* to the CU2 804*b* may include a recommendation from the interfered network node to an interfering network node. As an example, the CU1 804*a* may provide a recommendation to the CU2 804*b* to change a slot format to align with the interfered DU1 702*a*. The recommendation may include information about the slot format of the interfered DU1 702*a* and/or the adjustment needed for the increased alignment.

As another example, the CU1 804*a* may provide a recommendation to the CU2 804*b* to change the subband configuration or to mute the downlink bandwidth at the interfering base station. The muted downlink bandwidth may correspond to the uplink bandwidth of the interfered DU1 702*a*, e.g., to mitigate the interference from the DU2 802*b* that is experienced by the DU1 802*a*. FIG. 8B illustrates example resource diagrams showing an example of resources 860 allocated for communication at the DU1 802 and the DU2 802*b*. As shown at slot 862, the DU2 may mute a downlink transmission on sub-band 1 that may cause interference to the uplink reception at DU1 during the slot 862.

As another example, the CU1 804*a* may provide a recommendation to the CU2 804*b* to reduce the downlink transmission power. In some aspects, the recommendation may include a suggested power backoff value.

As another example, the CU1 804*a* may provide a recommendation to the CU2 804*b* to increase the guard band between the two adjacent channels of the two operators to mitigate the interference. For example, as shown at 870 in FIG. 8B, there may be a guard band between the resources for the DU1 802*a* and the resources for the DU2 802*b*, which can be increased to reduce the interference experienced by the DU1 802*a*. In the example at 870, the DU2 802*b* may skip downlink transmission on the sub-band 1, for example, to increase the guard band.

As another example, the CU1 804*a* may provide a recommendation to the CU2 804*b* to adjust the timing such that the interfering signal is received within a time correspond to a cyclic prefix (CP) at the DU1 802*a* to mitigate the leakage of the signal from the DU2.

As another example, the CU1 804*a* may provide a recommendation to the CU2 804*b* to restrict certain beams or directions at the DU 802*b* for CLI mitigation of the CLI experienced at the DU1 802*a*.

As another example, the CU1 804*a* may provide a recommendation to the CU2 804*b* to use certain preferred beams or direction for which the DU1 802*a* experiences limited CLI (e.g., CLI below a threshold value) from the DU2 802*b*.

Figure 9:
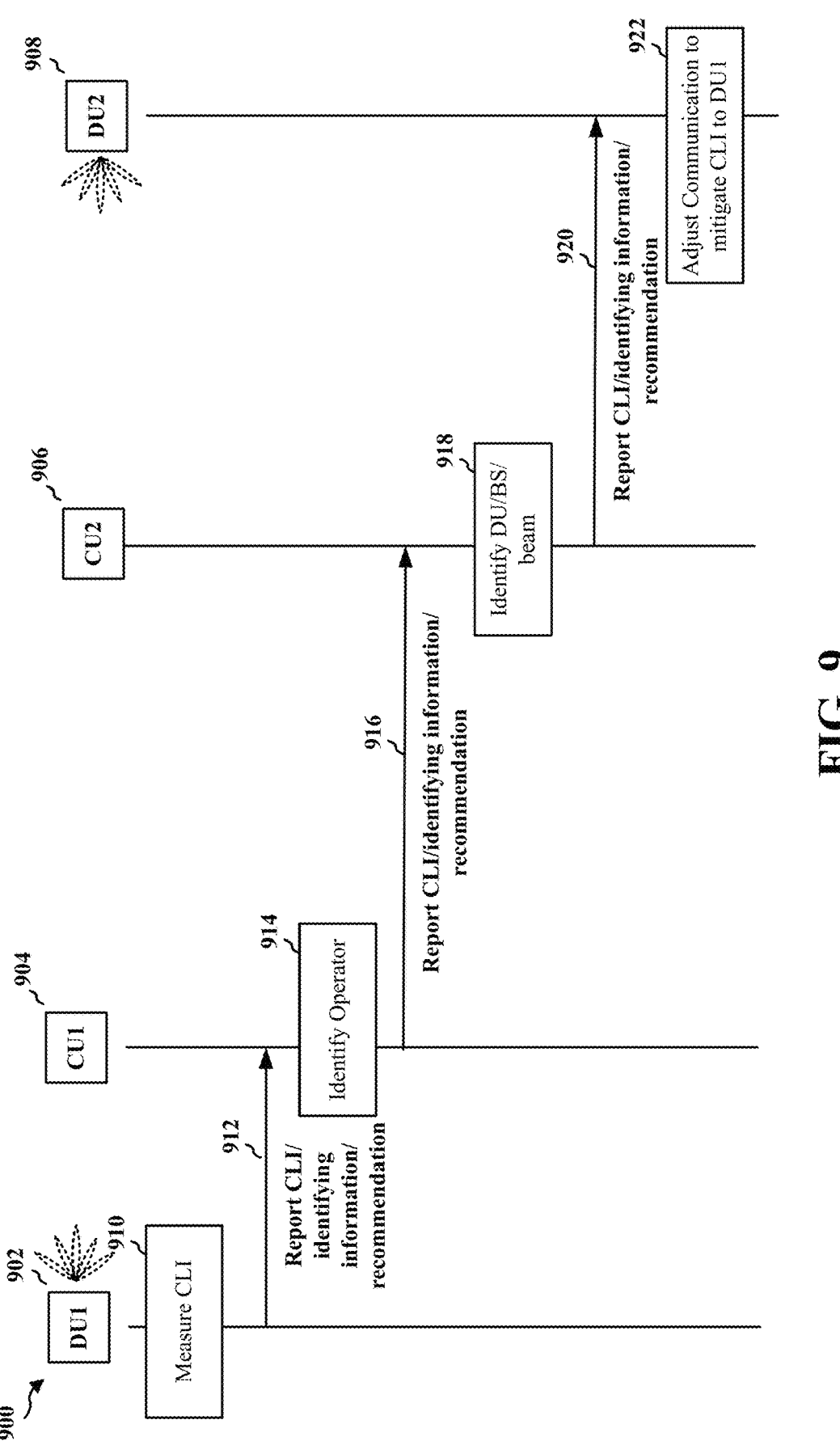
FIG. 9 includes a call flow diagram of a method of wireless communication between network nodes in accordance with some aspects of the disclosure.

FIG. 9 illustrates an example communication flow 900 between a DU 902 and CU 904 of a first operator and a DU 908 and CU 906 of a second operator. As illustrated at 910, the DU 902 may measure or identify CLI experienced from a DU of another operator, e.g. the DU 908. The DU 902 reports the CLI to the CU 904, at 912, and the report may include any of the information described in connection with FIG. 8A or 8B. At 914, the CU 904 identifies the operator using the information including in the report from the DU 902. The CU reports the CLI, at 916, to the CU 906 along with information that allows the CU of the other operator to identify the DU that is the source of the interference. The transmission may be over an Xn interface between the CUs, for example. The information may include any of the aspects described in connection with FIG. 8A or 8B. At 918, the CU 906 identifies the DU, the base station, or the beam that is causing interference to the DU 902. The CU 906 provides an indication to the DU 908 about the CLI, at 920. The indication may include information about the interference, such as a beam direction, etc. The indication may include any of the information received from the CU 904. The indication may include one or more recommendations from the CU 904 and/or from the CU 906. At 922, the DU 908 may adjust communication to mitigate the interference to communication of the DU 902. For example, the DU 908 may mute some resources, increase a guard band, adjust a timing to align with communication at the DU 902, decrease a transmission power, use a different beam direction, etc. to reduce the CLI to the DU 902.

FIG. 10 is a flowchart 1000 of a method of wireless communication. The method may be performed by a network node, which may be a base station or a component of a base station (e.g., the base station 102, 310, 602*b*; CU 110, 804*a*, 904; DU 130, 802*a*, 902; the network entity 1202 or 1302). The method may enable the mitigation of CLI between base stations of different operators.

At 1002, the network node identifies cross-link interference to a first channel of a first network node associated with a first operator, the cross-link interference being caused by a second channel from a second network node that is associated with a second operator that is different than the first operator. The identification may be performed, e.g., by the CLI component 198. The second channel of the second operator may be an adjacent channel to the first channel of the first operator. The method may be performed by a first network node that is a DU (e.g., DU 902) of the first operator, and to identify the cross-link interference, the DU may measure the cross-link interference to the first channel of the first network node and report the cross-link interference to a CU (e.g., CU 904) of the first operator. In some aspects, the first network node may be a DU (e.g., the DU 902) and the method may be performed at a first CU (e.g., CU 904) of the first operator that is configured to identify the cross-link interference in a report received from the DU of the first operator, and to report the cross-link interference to a second CU (e.g., 906) of the second operator in Xn signaling.

At 1004, the network node reports the cross-link interference to the first channel of the first network node with additional information to identify at least one of the second channel or the second network node. The reporting may be performed, e.g., by the CLI component 198. In some aspects, the additional information may include a detected ARFCN for the second channel. The additional information reported with the cross-link interference includes one or more of: an inter-base station blocking indication that indicates blocking from an adjacent channel of a different operator than the first operator, a measured inter-base station CLI metric, or beam direction information including at least one of a reception beam of the first network node associated with the first operator or a transmission beam of the second network node associated with the second operator.

The additional information identifying the at least one of the second channel or the second network node that is a source of the cross-link interference may include one or more of: an absolute radio frequency channel number (e.g., ARFCN) that identifies the second channel causing the cross-link interference to the first channel of the first network node, location information for the second network node causing the cross-link interference to the first channel of the first network node, or an identifier of the second network node causing the cross-link interference to the first channel of the first network node.

The network node may report the cross-link interference with one or more recommendations of: a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more beam preferred directions of the second network node for which there is less than a threshold amount of the cross-link interference at the first network node.

FIG. 11 is a flowchart 1100 of a method of wireless communication. The method may be performed by a network node, which may be a base station or a component of a base station (e.g., the base station 102, 310, 602*b*; CU 110, 804*b*, 906; DU 130, 802*b*, 908; the network entity 1202 or 1302). The method may enable the mitigation of CLI between base stations of different operators.

At 1102, the network node receives signaling indicating cross-link interference to a first channel of a first network node associated with a first operator, the cross-link interference being caused by a second channel from a second network node that is associated with a second operator that is different than the first operator. The reception may be performed, e.g., by the component 199. The second channel of the second operator may be an adjacent channel to the first channel of the first operator. The second network node that performs the method may be a DU (e.g., DU 802*b* or 908) of the second operator that is configured to receive the signaling from a second CU (e.g., CU 804*b* or 906) of the second operator based on the cross-link interference reported from a first CU of the first operator. In some aspects, the second network node may be a second DU (e.g., DU 802*b* of the second operator that is configured to provide the second channel that causes the cross-link interference to the first channel of a first DU of the first operator, the method being performed at a second CU (e.g., CU 804*b* or 906) of the second operator that receives the signaling in Xn signaling from a first CU of the first operator. In some aspects, the CU may report the cross-link interference from the second CU to the second DU.

In some aspects, the network node may identify the second network node based on additional information included in the signaling indicating the cross-link interference, the additional information identifying at least one of the second channel or the second network node that is a source of the cross-link interference. The additional information may include a detected ARFCN for the second channel, in some aspects.

The additional information reported with the cross-link interference includes one or more of: an inter-base station blocking indication that indicates blocking from an adjacent channel of a different operator than the first operator, a measured inter-base station CLI metric, or beam direction information including at least one of a reception beam of the first network node associated with the first operator or a transmission beam of the second network node associated with the second operator.

The additional information identifying the at least one of the second channel or the second network node that is a source of the cross-link interference may include one or more of: an ARFCN that identifies the second channel causing the cross-link interference to the first channel of the first network node, location information for the second network node causing the cross-link interference to the first channel of the first network node, or an identifier of the second network node causing the cross-link interference to the first channel of the first network node.

The network node may report the cross-link interference with one or more recommendations of: a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more beam preferred directions of the second network node for which there is less than a threshold amount of the cross-link interference at the first network node.

At 1104, the network node adjusts communication at the second network node in response to reduce the cross-link interference to the first network node. The adjustment may be performed, e.g., by the component 199. As described in connection with 922, the adjustment may include any of muting some resources, increasing a guard band, adjusting a timing to align with communication at the interfered DU, decreasing a transmission power, using a different beam direction, etc. to reduce the CLI to the interfered DU.

Figure 12:
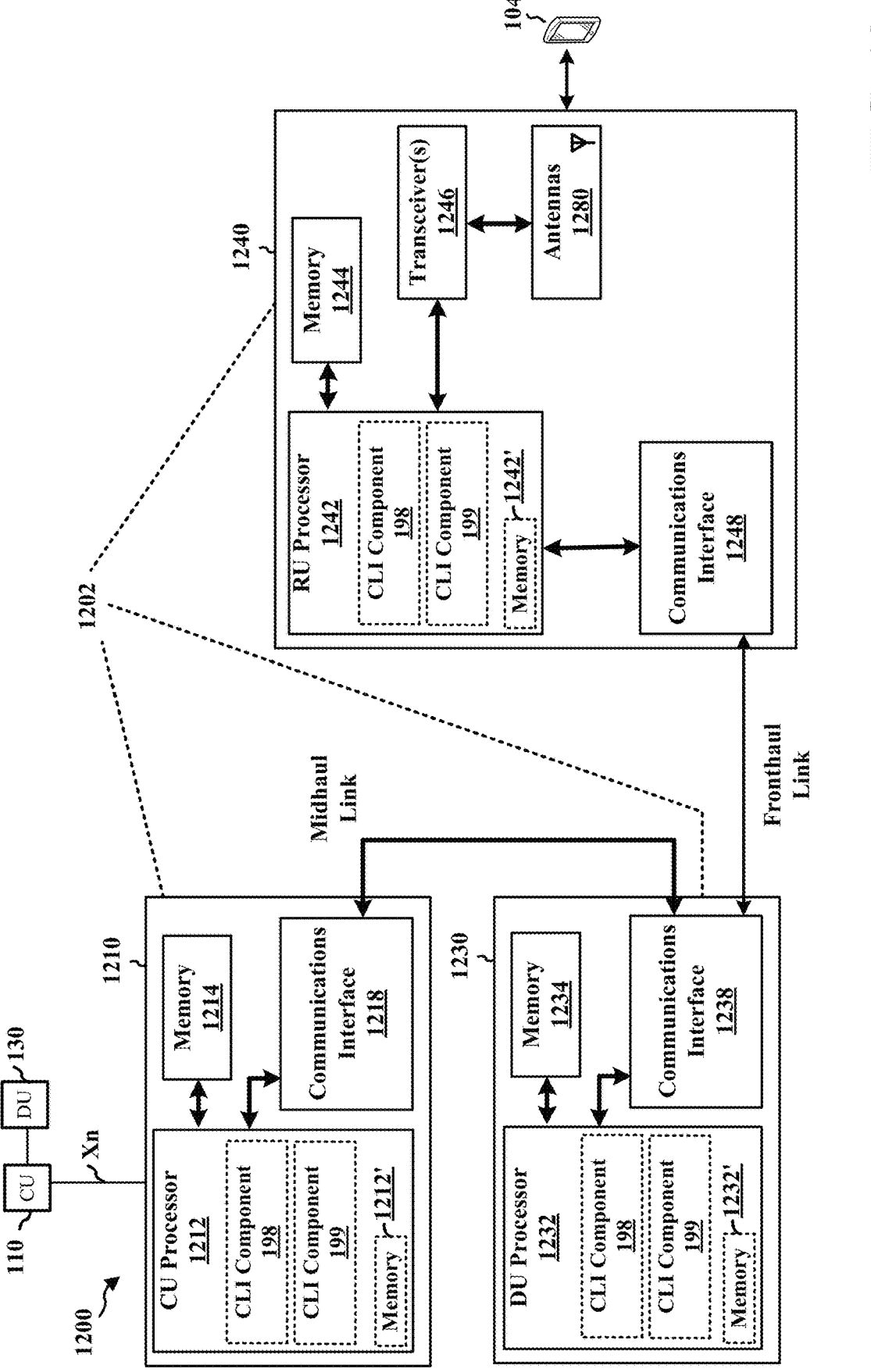
FIG. 12 is a diagram illustrating an example of a hardware implementation for an example network entity.

FIG. 12 is a diagram 1200 illustrating an example of a hardware implementation for a network entity 1202, which may also be referred to interchangeably as a network node. The network entity 1202 may be a BS, a component of a BS, or may implement BS functionality. The network entity 1202 may include at least one of a CU 1210, a DU 1230, or an RU 1240. For example, depending on the layer functionality handled by the component 199, the component 198, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed herein, the CLI component 198 is configured to identify cross-link interference to a first channel of a first network node associated with a first operator, the cross-link interference being caused by a second channel from a second network node that is associated with a second operator that is different than the first operator; and report the cross-link interference to the first channel of the first network node with additional information to identify at least one of the second channel or the second network node. As discussed herein, the CLI component 199 is configured to receive signaling indicating cross-link interference to a first channel of a first network node associated with a first operator, the cross-link interference being caused by a second channel from a second network node that is associated with a second operator that is different than the first operator; and adjust communication at the second network node in response to reduce the cross-link interference to the first network node. The component 199 and/or component 198 may be within one or more processors of one or more of the CU 1210, DU 1230, and the RU 1240. The component 199 and/or component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for receiving signaling indicating cross-link interference to a first channel of a first network node associated with a first operator, the cross-link interference being caused by a second channel from a second network node that is associated with a second operator that is different than the first operator; and means for adjusting communication at the second network node in response to reduce the cross-link interference to the first network node. The network entity 1202 may further include means for identifying cross-link interference to a first channel of a first network node associated with a first operator, the cross-link interference being caused by a second channel from a second network node that is associated with a second operator that is different than the first operator; and means for reporting the cross-link interference to the first channel of the first network node with additional information to identify at least one of the second channel or the second network node. The network entity may further include means for performing any of the aspects described in connection with FIG. 10, FIG. 11, and/or the aspects performed by the DU 902, CU 904, DU 802a, or CU 804a. The means may be the component 199 and/or the CLI component 198 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
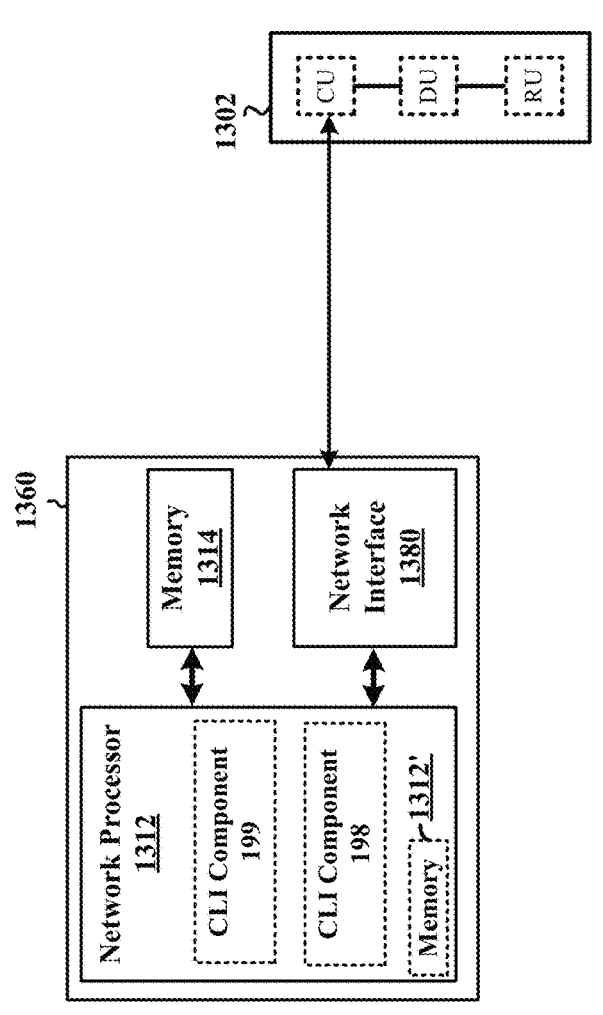
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU (e.g., network entity 1302). The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the CLI component 198 is configured to identify cross-link interference to a first channel of a first network node associated with a first operator, the cross-link interference being caused by a second channel from a second network node that is associated with a second operator that is different than the first operator; and report the cross-link interference to the first channel of the first network node with additional information to identify at least one of the second channel or the second network node. As discussed herein, the CLI component 199 is configured to receive signaling indicating cross-link interference to a first channel of a first network node associated with a first operator, the cross-link interference being caused by a second channel from a second network node that is associated with a second operator that is different than the first operator; and adjust communication at the second network node in response to reduce the cross-link interference to the first network node. The network entity 1360 may include the CLI component 198 and/or the CLI component 199. The component 198 or 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for receiving signaling indicating cross-link interference to a first channel of a first network node associated with a first operator, the cross-link interference being caused by a second channel from a second network node that is associated with a second operator that is different than the first operator; and means for adjusting communication at the second network node in response to reduce the cross-link interference to the first network node. The network entity 1302 may further include means for identifying cross-link interference to a first channel of a first network node associated with a first operator, the cross-link interference being caused by a second channel from a second network node that is associated with a second operator that is different than the first operator; and means for reporting the cross-link interference to the first channel of the first network node with additional information to identify at least one of the second channel or the second network node. The network entity may further include means for performing any of the aspects described in connection with FIG. 10, FIG. 11, and/or the aspects performed by the DU 902, CU 904, DU 802a, or CU 804a. The means may be the component 198 and/or 199 of the network entity 1360 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication including identifying cross-link interference to a first channel of a first network node associated with a first operator, the cross-link interference being caused by a second channel from a second network node that is associated with a second operator that is different than the first operator; and reporting the cross-link interference to the first channel of the first network node with information to identify at least one of the second channel or the second network node.

In aspect 2, the method of aspect 1 further includes that the second channel of the second operator is an adjacent channel to the first channel of the first operator.

In aspect 3, the method of aspect 1 or aspect 2 further includes that the method is performed by the first network node that is a DU of the first operator, wherein identifying the cross-link interference includes measuring the cross-link interference to the first channel of the first network node, and wherein the first network node reports the cross-link interference to a CU of the first operator, the additional information including a detected ARFCN for the second channel.

In aspect 4, the method of aspect 1 or aspect 2 further includes that the first network node is a DU, and the method is performed by a first CU of the first operator that identifies the cross-link interference in a report received from the DU of the first operator, and the cross-link interference is reported to a second CU of the second operator in Xn signaling, the additional information including a detected ARFCN for the second channel.

In aspect 5, the method of any of aspects 1-4 further includes that the information reported with the cross-link interference includes one or more of: an inter-base station blocking indication that indicates blocking from an adjacent channel of a different operator than the first operator, a measured inter-base station CLI metric, or beam direction information including at least one of a reception beam of the first network node associated with the first operator or a transmission beam of the second network node associated with the second operator.

In aspect 6, the method of any of aspects 1-5 further includes that the information identifying the at least one of the second channel or the second network node that is a source of the cross-link interference includes one or more of: an ARFCN that identifies the second channel causing the cross-link interference to the first channel of the first network node, location information for the second network node causing the cross-link interference to the first channel of the first network node, or an identifier of the second network node causing the cross-link interference to the first channel of the first network node.

In aspect 7, the method of any of aspects 1-6 further includes that the cross-link interference is reported with one or more recommendations of: a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more beam preferred directions of the second network node for which there is less than a threshold amount of the cross-link interference at the first network node.

Aspect 8 is an apparatus for wireless communication including means for performing the method of any of aspects 1-7.

Aspect 9 is an apparatus for wireless communication including a memory and at least one processor coupled to the memory and, based at least in part on information stored in the memory, the at least one processor is configured to perform the method of any of aspects 1-7.

In aspect 10, the apparatus of aspect 8 or aspect 9 includes at least one transceiver or at least one antenna coupled to the at least one processor.

Aspect 11 is a non-transitory computer-readable medium storing computer executable code at a network node, the code when executed by a processor causes the processor to perform the method of any of aspects 1-7.

Aspect 12 is a method of wireless communication, comprising: receiving signaling indicating cross-link interference to a first channel of a first network node associated with a first operator, the cross-link interference being caused by a second channel from a second network node that is associated with a second operator that is different than the first operator; and adjusting communication at the second network node in response to reduce the cross-link interference to the first network node.

In aspect 13, the method of aspect 12 further includes that the second channel of the second operator is an adjacent channel to the first channel of the first operator.

In aspect 14, the method of aspect 12 or 13 further includes that the second network node is a DU of the second operator that receives the signaling from a second CU of the second operator based on the cross-link interference reported from a first CU of the first operator, the additional information including a detected ARFCN for the second channel.

In aspect 15, the method of aspect 12 or 13 further includes that the second network node is a second DU of the second operator that provides the second channel that causes the cross-link interference to the first channel of a first DU of the first operator, the method being performed by a second CU of the second operator that receives the signaling in Xn signaling from a first CU of the first operator, the method further comprising reporting the cross-link interference from the second CU to the second DU, the additional information including a detected ARFCN for the second channel.

In aspect 16, the method of any of aspects 12-15 further includes that the signaling includes additional information reported with the cross-link interference, the additional information including one or more of: an inter-base station blocking indication that indicates blocking from an adjacent channel of a different operator than the first operator, a measured inter-base station CLI metric, or beam direction information including at least one of a reception beam of the first network node associated with the first operator or a transmission beam of the second network node associated with the second operator.

In aspect 17, the method of any of aspects 12-16, the method further comprising identifying the second network node based on additional information included in the signaling indicating the cross-link interference, the additional information identifying at least one of the second channel or the second network node that is a source of the cross-link interference.

In aspect 18, the method of any of aspects 12-17 further includes that the signaling further includes one or more recommendations of: a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more preferred beam directions of the second network node for which there is less than a threshold amount of interference at the first network node.

In aspect 19, the method of any of aspects 12, 13, or 15, 16, or 18 further includes identifying the second network node based on information included in the signaling indicating the cross-link interference, the information identifying at least one of the second channel or the second network node that is a source of the cross-link interference, wherein the information identifying the at least one of the second channel or the second network node that is the source of the cross-link interference includes one or more of: an ARFCN that identifies the second channel causing the cross-link interference to the first channel of the first network node, location information for the second network node causing the cross-link interference to the first channel of the first network node, or an identifier of the second network node causing the cross-link interference to the first channel of the first network node.

Aspect 20 is an apparatus for wireless communication including means for performing the method of any of aspects 12-19.

Aspect 21 is an apparatus for wireless communication including a memory and at least one processor coupled to the memory and, based at least in part on information stored in the memory, the at least one processor is configured to perform the method of any of aspects 12-19.

In aspect 22, the apparatus of aspect 20 or aspect 21 includes at least one transceiver or at least one antenna coupled to the at least one processor.

Aspect 23 is a non-transitory computer-readable medium storing computer executable code at a network node, the code when executed by a processor causes the processor to perform the method of any of aspects 12-18.

What is claimed is:

1. An apparatus for wireless communication, comprising:
memory; and
at least one processor coupled to the memory and, based at least in part on information stored in the memory, the at least one processor is configured to:
identify cross-link interference to a first channel of a first network node associated with a first operator, wherein the cross-link interference is caused by a second channel from a second network node that is associated with a second operator that is different than the first operator; and
report the cross-link interference to the first channel of the first network node with additional information to identify at least one of the second channel or the second network node of the second operator.

2. The apparatus of claim 1, wherein the second channel of the second operator is an adjacent channel to the first channel of the first operator.

3. The apparatus of claim 1, wherein the apparatus is for the wireless communication at the first network node that is a distributed unit (DU) of the first operator, wherein to identify the cross-link interference, the at least one processor is further configured to measure the cross-link interference to the first channel of the first network node and report the cross-link interference to a central unit (CU) of the first operator, and wherein the additional information includes a detected absolute radio-frequency channel number (ARFCN) for the second channel.

4. The apparatus of claim 1, wherein the first network node is a distributed unit (DU), and the apparatus is for the wireless communication at a first central unit (CU) of the first operator that is configured to identify the cross-link interference in a report received from the DU of the first operator, and the at least one processor is configured to report the cross-link interference to a second CU of the second operator in Xn signaling, and wherein the additional information includes a detected absolute radio-frequency channel number (ARFCN) for the second channel.

5. The apparatus of claim 1, wherein the additional information reported with the cross-link interference includes one or more of:
an inter-base station blocking indication that indicates blocking from an adjacent channel of a different operator than the first operator,
a measured inter-base station cross-link interference (CLI) metric, or
beam direction information that includes at least one of a reception beam of the first network node associated with the first operator or a transmission beam of the second network node associated with the second operator.

6. The apparatus of claim 1, wherein the additional information identifies the at least one of the second channel or the second network node that is a source of the cross-link interference includes one or more of:
an absolute radio frequency channel number (ARFCN) that identifies the second channel that causes the cross-link interference to the first channel of the first network node,
location information for the second network node that causes the cross-link interference to the first channel of the first network node, or
an identifier of the second network node that causes the cross-link interference to the first channel of the first network node.

7. The apparatus of claim 1, wherein the at least one processor is further configured to report the cross-link interference with one or more recommendations of:
a first indication of a first change to a second slot format of the second network node,
a second indication of a second change to a sub-band configuration for the second network node,
a third indication of resources for muting at the second network node,
a fourth indication for the second network node to reduce a transmission power,
a fifth indication for the second network node to increase a guard band between the first channel of the first network node and the second channel of the second network node,
a sixth indication of a timing adjustment to align an interfering signal on the second channel with reception of a cyclic prefix at the first network node,
a seventh indication of one or more interfering beam directions of the second network node that cause the cross-link interference to the first network node, or
an eighth indication of one or more beam preferred directions of the second network node for which there is less than a threshold amount of the cross-link interference at the first network node.

8. The apparatus of claim 1, further comprising:
at least one transceiver coupled to the at least one processor.

9. An apparatus for wireless communication, comprising:
memory; and
at least one processor coupled to the memory and, based at least in part on information stored in the memory, the at least one processor is configured to:
receive signaling that indicates cross-link interference to a first channel of a first network node associated with a first operator, wherein the cross-link interference is caused by a second channel from a second network node that is associated with a second operator that is different than the first operator; and adjust communication at the second network node of the second operator in response to reduce the cross-link interference to the first network node of the first operator.

10. The apparatus of claim 9, wherein the second channel of the second operator is an adjacent channel to the first channel of the first operator.

11. The apparatus of claim 9, wherein the second network node is a distributed unit (DU) of the second operator that is configured to receive the signaling from a second central unit (CU) of the second operator based on the cross-link interference reported from a first CU of the first operator, and wherein the signaling that indicates the cross-link interference further includes a detected absolute radio-frequency channel number (ARFCN) for the second channel.

12. The apparatus of claim 9, wherein the second network node is a second distributed unit (DU) of the second operator that is configured to provide the second channel that causes the cross-link interference to the first channel of a first DU of the first operator, wherein the apparatus is for the wireless communication at a second central unit (CU) of the second operator that is configured to receive the signaling in Xn signaling from a first CU of the first operator, and wherein the at least one processor is further configured to:

report the cross-link interference from the second CU to the second DU, and wherein the report of the cross-link interference further includes a detected absolute radio-frequency channel number (ARFCN) for the second channel.

13. The apparatus of claim 9, wherein the signaling includes additional information in a report with the cross-link interference, and wherein the additional information includes one or more of:

an inter-base station blocking indication that indicates blocking from an adjacent channel of a different operator than the first operator, a measured inter-base station cross-link interference (CLI) metric, or beam direction information that includes at least one of a reception beam of the first network node associated with the first operator or a transmission beam of the second network node associated with the second operator.

14. The apparatus of claim 9, wherein the at least one processor is further configured to:

identify the second network node based on additional information included in the signaling that indicates the cross-link interference, wherein the additional information identifies at least one of the second channel or the second network node that is a source of the cross-link interference.

15. The apparatus of claim 14, wherein the additional information that identifies the at least one of the second channel or the second network node that is the source of the cross-link interference includes one or more of:

an absolute radio frequency channel number (ARFCN) that identifies the second channel that causes the cross-link interference to the first channel of the first network node, location information for the second network node that causes the cross-link interference to the first channel of the first network node, or an identifier of the second network node that causes the cross-link interference to the first channel of the first network node.

16. The apparatus of claim 9, wherein the cross-link interference is reported with one or more recommendations of:

a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more preferred beam directions of the second network node for which there is less than a threshold amount of interference at the first network node.

17. The apparatus of claim 9, further comprising:

at least one transceiver coupled to the at least one processor.

18. A method of wireless communication, comprising:

identifying cross-link interference to a first channel of a first network node associated with a first operator, the cross-link interference being caused by a second channel from a second network node that is associated with a second operator that is different than the first operator; and reporting the cross-link interference to the first channel of the first network node with information to identify at least one of the second channel or the second network node of the second operator.

19. The method of claim 18, wherein the second channel of the second operator is an adjacent channel to the first channel of the first operator.

20. The method of claim 18, wherein the method is performed by the first network node that is a distributed unit (DU) of the first operator, wherein identifying the cross-link interference includes measuring the cross-link interference to the first channel of the first network node, and wherein the first network node reports the cross-link interference to a central unit (CU) of the first operator, and wherein a report of the cross-link interference further includes additional information including a detected absolute radio-frequency channel number (ARFCN) for the second channel.

21. The method of claim 18, wherein the first network node is a distributed unit (DU), and the method is performed by a first central unit (CU) of the first operator that identifies the cross-link interference in a report received from the DU of the first operator, and the cross-link interference is reported to a second CU of the second operator in Xn signaling, and the cross-link interference is reported with additional information including a detected absolute radio-frequency channel number (ARFCN) for the second channel.

22. The method of claim 18, wherein the information reported with the cross-link interference includes one or more of:

an inter-base station blocking indication that indicates blocking from an adjacent channel of a different operator than the first operator, a measured inter-base station cross-link interference (CLI) metric, or beam direction information including at least one of a reception beam of the first network node associated with the first operator or a transmission beam of the second network node associated with the second operator.

23. The method of claim 18, wherein the information identifying the at least one of the second channel or the second network node that is a source of the cross-link interference includes one or more of:

an absolute radio frequency channel number (ARFCN) that identifies the second channel causing the cross-link interference to the first channel of the first network node, location information for the second network node causing the cross-link interference to the first channel of the first network node, or an identifier of the second network node causing the cross-link interference to the first channel of the first network node.

24. The method of claim 18, wherein the cross-link interference is reported with one or more recommendations of:

a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more beam preferred directions of the second network node for which there is less than a threshold amount of the cross-link interference at the first network node.

25. A method of wireless communication, comprising:

receiving signaling indicating cross-link interference to a first channel of a first network node associated with a first operator, the cross-link interference being caused by a second channel from a second network node that is associated with a second operator that is different than the first operator; and adjusting communication at the second network node of the second operator in response to reduce the cross-link interference to the first network node of the first operator.

26. The method of claim 25, wherein the second channel of the second operator is an adjacent channel to the first channel of the first operator.

27. The method of claim 25, wherein the second network node is a distributed unit (DU) of the second operator that receives the signaling from a second central unit (CU) of the second operator based on the cross-link interference reported from a first CU of the first operator, and wherein the signaling that indicates the cross-link interference further includes additional information including a detected absolute radio-frequency channel number (ARFCN) for the second channel.

28. The method of claim 25, wherein the second network node is a second distributed unit (DU) of the second operator that provides the second channel causing the cross-link interference to the first channel of a first DU of the first operator, the method being performed by a second central unit (CU) of the second operator that receives the signaling in Xn signaling from a first CU of the first operator, the method further comprising:

reporting the cross-link interference from the second CU to the second DU, and wherein a report of the cross-link interference further includes additional information including a detected absolute radio-frequency channel number (ARFCN) for the second channel.

29. The method of claim 25, wherein the signaling includes information reported with the cross-link interference, the information including one or more of:

an inter-base station blocking indication that indicates blocking from an adjacent channel of a different operator than the first operator, a measured inter-base station cross-link interference (CLI) metric, beam direction information including at least one of a reception beam of the first network node associated with the first operator or a transmission beam of the second network node associated with the second operator, or one or more recommendations of:

a first indication of a first change to a second slot format of the second network node, a second indication of a second change to a sub-band configuration for the second network node, a third indication of resources for muting at the second network node, a fourth indication for the second network node to reduce a transmission power, a fifth indication for the second network node to increase a guard band between the first channel of the first network node and the second channel of the second network node, a sixth indication of a timing adjustment to align an interfering signal on the second channel with reception of a cyclic prefix at the first network node, a seventh indication of one or more interfering beam directions of the second network node that cause the cross-link interference to the first network node, or an eighth indication of one or more preferred beam directions of the second network node for which there is less than a threshold amount of interference at the first network node.

30. The method of claim 25, further comprising:

identifying the second network node based on information included in the signaling indicating the cross-link interference, the information identifying at least one of the second channel or the second network node that is a source of the cross-link interference, wherein the information identifying the at least one of the second channel or the second network node that is the source of the cross-link interference includes one or more of:

an absolute radio frequency channel number (ARFCN) that identifies the second channel causing the cross-link interference to the first channel of the first network node, location information for the second network node caus-
ing the cross-link interference to the first channel of
the first network node, or an identifier of the second network node causing the
cross-link interference to the first channel of the first
network node.

31. The apparatus of claim 1, wherein the cross-link
interference is inter-operator, inter-base station cross-link
interference associated with network node of a different
wireless operator that communicates on different frequency
channels that the first operator.

\* \* \* \* \*